United States Patent [11] 3,617,652

[72] Inventor Gerhard Krause
Darmstadt, Germany
[21] Appl. No. 831,109
[22] Filed June 6, 1969
[45] Patented Nov. 2, 1971
[73] Assignee Fernsch GmbH
Darmstadt, Germany
[32] Priority June 8, 1968
[33] Germany
[31] P 17 74 392.9

[54] ARRANGEMENT FOR CONTROLLING THE RECORDING OF SIGNALS ON MAGNETIC STORAGE DEVICES
14 Claims, 5 Drawing Figs.

[52] U.S. Cl. .......... 179/100.2T, 179/100.2 B, 179/100.2 CF, 179/100.2 CH
[51] Int. Cl. .......... G11b 27/36, G11b 5/34, G11b 5/38
[50] Field of Search .......... 179/100.2 T, 100.2 B, 100.2 CF, 100.2 CH

[56] References Cited

UNITED STATES PATENTS 3,225,135 12/1965 Osawa et al. .......... 179/100.2
3,239,823 3/1966 Chang .......... 179/100.2
3,369,082 2/1968 Hibbard .......... 179/100.2

FOREIGN PATENTS 1,328,708 4/1963 France .......... 179/100.2

*Primary Examiner*—Terrell W. Fears
*Attorney*—Michael S. Striker

ABSTRACT: An arrangement for controlling the recording of signals on magnetic storage devices while the recording process takes place. Magnetic tape has information recorded on it through tracks which are inclined to the direction of motion of the tape. Viewed from the direction of motion of the magnetic tape, a control magnetic head is located behind the recording head. An electromagnetic coil wound upon the control magnetic head directs magnetic flux lines perpendicular to the direction of the recorded tracks. A voltage signal dependent upon the central magnetization of the tracks is generated and indicated. The electromagnetic coil may be in the form of an oscillating circuit with resonance frequency as a function of the magnetization of the tracks. A signal varying with the resonance frequency is indicated.

Inventor:
Gerhard Krause
by
Attorney

Inventor:
Gerhard Krause
by [signature]
Attorney

ARRANGEMENT FOR CONTROLLING THE RECORDING OF SIGNALS ON MAGNETIC STORAGE DEVICES

BACKGROUND OF THE INVENTION

The present invention resides in an arrangement for controlling the recoding of electrical signals when recorded on magnetic storage elements. In the arrangement of the present invention, the direction of the recoding tracks are inclined to the direction of motion of the magnetic storage means.

In controlling the recording of electrical signals upon magnetic storage elements during the recording process, it is conventional practice to provide a complete playback arrangement behind the recording arrangement, in the direction of motion of the recording element or recording carrier. Such playback arrangements are considerably complex, particularly in case of magnetic storage or magnetic recording members in the form of rotating heads. Such magnetic recording means with rotating heads are used in recording television signals and information for data processing. Accordingly, in the use of machines which operate on the principle of cross recording, it is required, for example, to provide an additional head-carrying wheel, as conventionally used in the art. Such an additional head-carrying wheel has arranged on it four magnetic heads which operate in conjunction with additional circuits for purposes of control and signal processing.

The operating life of such head-carrying wheels is approximately between 100 and 150 hours. When taking into account such short operating life, therefore, the solution mentioned above, is not practical. The tape-wear for such a case, furthermore, is doubled and the isolation of the high intensity recording field of the recording heads, from the low intensity or weak playback field, is considerably difficult.

Accordingly, it is an object of the present invention to provide an arrangement for controlling the recording of electrical signals upon magnetic storage elements while the recording process takes place.

It is a specific object of the present invention to provide such an arrangement which is simple in design and the wear of magnetic tape is a minimum.

The solution to the preceding objects, in accordance with the present invention, is based on the principle that it is not essential to reproduce the recorded signals in such a controlling arrangement. Instead, it is sufficient to measure the average magnetization of the recording carrier.

In accordance with the present invention, a control magnetic head is arranged behind the recording means taken in the direction of motion of the recording carrier. The control magnetic head has a coil with current flow directed through it so that the flux lines are normal to the direction of the tracks. The gap width of the control magnetic head, furthermore, corresponds substantially to the width of a track. A voltage dependent upon the magnetization is, moreover, produced.

The arrangement, in accordance with the present invention, has a particularly simple design through the provision of simple and monitoring or supervising indicating means.

In a further embodiment of the present invention, the control of a plurality or number of recording heads for recording upon tracks is accomplished through a cyclical interchange and through separate indication.

Through the preceding embodiment of the present invention, it is advantageously realized to make apparent the disturbing factors when disturbing effects prevail during recording. Thus, to the embodiment of the present invention, it is possible to determine which ones or how many of the magnetic heads take part in the disturbing or noise effects.

SUMMARY OF THE INVENTION

An arrangement for controlling the recording of signals on magnetic tape during the recoding process. The magnetic tape is transferred along a predetermined longitudinal path and past a recording head which records signals on the tape so that the resulting tracks containing the recorded information, are inclined to the direction of motion of the tape. When viewed from the direction of motion of the tape, a control magnetic head is located behind the recording head. A coil wound upon the control magnetic head, generates and directs magnetic flux lines perpendicular to the direction of the tracks. The gap width of the flux lines corresponds substantially to the width of a track. The playback voltage signal is made a function of the magnetization of a track.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 2:
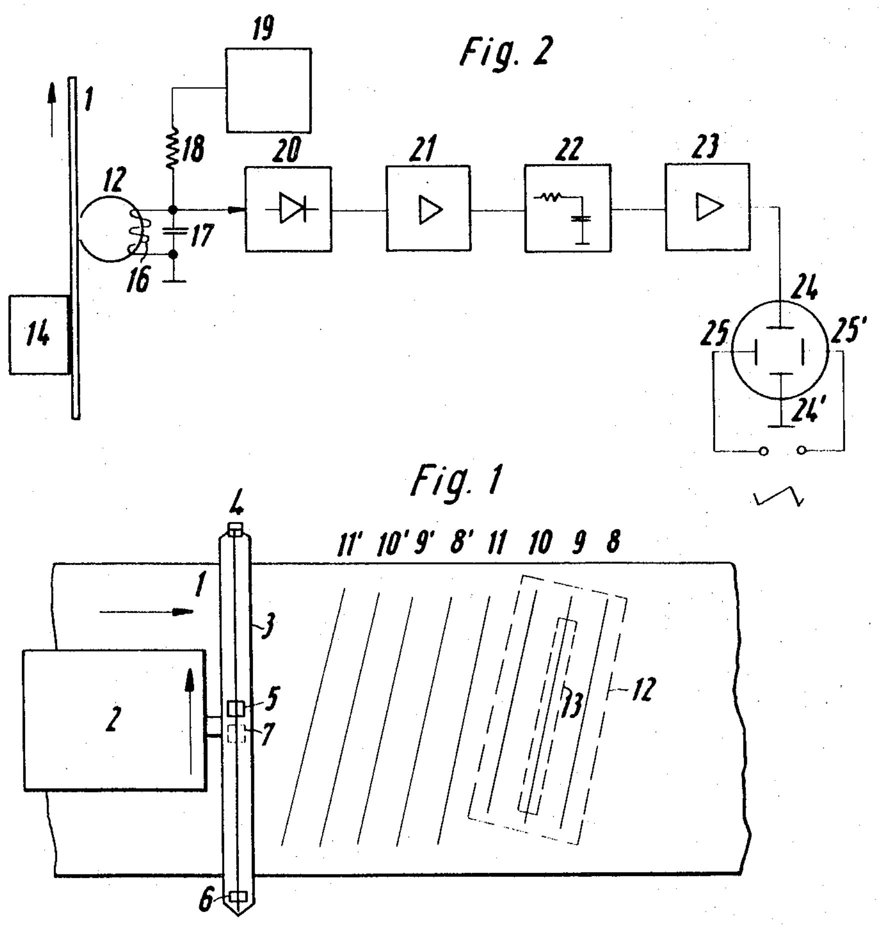
FIG. 1 is a schematically represented plan view for the recording of television signals with a four-head arrangement, in accordance with an embodiment of the present invention.
FIG. 2 is a schematic diagram of a circuit arrangement for generating and indicating a voltage corresponding to the magnetization of the individual tracks shown in FIG. 1.

Referring to the drawing, and in particular to FIG. 1, the magnetic tape 1 is moved in the direction shown by the arrow for purposes of playing back the recorded information. A motor 2 drives ahead wheel 3 which carries magnetic heads 4, 5, 6 and 7. These magnetic heads are displaced from each other by an angle of 90°, along the rim of the wheel. Through a contact arrangement, not shown, the magnetic band 1 is pressed against the wheel 3, so that the magnetic tape 1 contacts the rim of the wheel through an angle which exceeds 90°. As a result of such angular contacting of the magnetic tape with the rim of the wheel 3, one magnetic head will be situated against the tape 1, before the preceding magnetic head becomes removed from the tape. Tracks 8, 9, 10 and 11, as well as tracks 8', 9', 10' and 11' on the magnetic tape 1, result from the motion of the tape in the direction of the arrow, in combination with the rotation of the wheel 3.

Since the magnetic layer upon the magnetic tape 1 does not have a linear magnetic characteristic, the permeability of this layer is dependent upon the magnetization. For reasons of symmetry, the permeability is independent of the polarity or sign of the magnetization. As a result, the inductance of the control magnetic head 12 is dependent upon the magnetization of the magnetic storage or memory.

FIG. 2 shows an arrangement through which the inductance dependent upon the magnetization is converted to a signal voltage. The device 14 represents the required parts and members of the arrangement in FIG. 1, in simplified form. The magnetic tape 1 becomes moved in the direction denoted by the arrow. The control magnetic head 12 is provided with a coil 16 which forms an oscillating circuit in conjunction with a capacitor 17 connected in parallel with the coil. An AC voltage is supplied from an oscillator 19 having a frequency which is substantially equal to the resonance frequency of the oscillating circuit.

In order that the oscillating circuit not be too severely damped, the oscillator 19 has a high internal impedance which is represented through the resistor 18. Depending upon the magnetization of the magnetic tape 1, the inductance of the control magnetic head 12 varies, and the resonance frequency of the oscillating circuit varies correspondingly. The oscillator 19 is tuned to an edge of the resonance curve of the oscillating circuit 17, 18, and as a result, the amplitude of the AC voltage of the oscillating circuit varies also. This AC voltage becomes rectified through the rectifying circuit 20. The field strength of the control magnetic head 12 is made substantially low or weak, in order not to disturb the recorded information upon the magnetic tape 1. Consequently, a low voltage is associated with the oscillating circuit 16, 17. In view of such low voltage of the oscillating circuit 16, 17, an amplifier 21 is provided after the rectifier 20.

A filter 22 is connected to the output of the amplifier 21 for the purpose of filtering out the AC components from the rectified signal provided by the circuit 20 connected in series with the amplifier 21. The signal output from the filter 22 is applied to a further amplifier 23 which, in turn, applies the amplified and filtered signal to a pair of plates 24 and 24′ of an oscilloscope. A timing signal voltage generated synchronously with the rotational frequency of the head carrying wheel 3, is applied to the other two plates 25 and 25′ of the oscilloscope.

Figure 3:
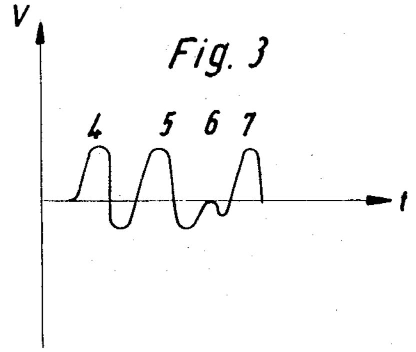
FIG. 3 is a graphical representation of voltage versus time as generated by the circuit arrangement of FIG. 2.

The voltage-time diagram appearing on the oscilloscope screen, is shown in FIG. 3. Each maximum of the voltage-time function represents the magnetization of the magnetic tape 1, as a result of a predetermined recording head. In the illustrative example shown in FIG. 3, the tracks of the magnetic heads 4, 5 and 7 are sufficiently magnetized, whereas the magnetization due to the magnetic head 6 is inadequate.

In place of the oscilloscope, other indicating instruments can also be used in the form of, for example, indicating lamps or acoustical signalling devices. By taking peak measurements selectively as a function of time, it is possible to measure, for example, the amplitudes of the individual maximums of the curve of FIG. 3 and to indicate them simultaneously through indicating instruments. Such indicating instruments may, for example, be manually actuated to the different maximum valves. When using indicating lamps, it is of advantage to provide for the lighting of these lamps when the magnetization drops below a predetermined threshold level.

Figure 4:
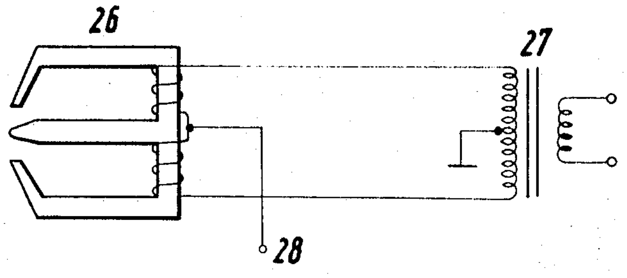
FIG. 4 shows schematically an arrangement in which the control magnetic head of FIGS. 1 and 2 is constructed in the form of a bridge circuit in which an alternating voltage is applied to the coil of the control magnetic head.

FIG. 4 illustrates an advantageous construction of the control magnetic head, in accordance with the present invention. The magnetic head 26 is subdivided into two identical portions. A coil which is also subdivided into two identical portions, is wound upon the core of the magnetic head 26. One set of ends of the two coil portions are joined together and to the terminal 28. The other ends of the two coil portions lead to a transformer 27 which is center tapped. As a result of the center tap which is connected to ground potential, symmetrically opposite voltages are applied to the coil portions on the core of the magnetic head 26. If the permeability of the magnetic tape is identical on both portions of the gap of the magnetic head 26, then the inductance of the two coil portions are also identical. Since the voltages applied to the ends of the coils or coil portions are symmetrical with respect to ground potential, no voltage appears at the circuit terminal 28. The width of the gap is selected, so that depending upon the position of the magnetic tape, one gap falls between the tracks, whereas the other gap falls into the center of the track. As a result of the different magnitudes of inductance of the coil portions, a voltage corresponding to the magnetization of the track appears at the circuit terminal 28. This voltage may be applied to indicating means in a manner similar to that described in relation with FIGS. 2 and 3 above.

Figure 5:
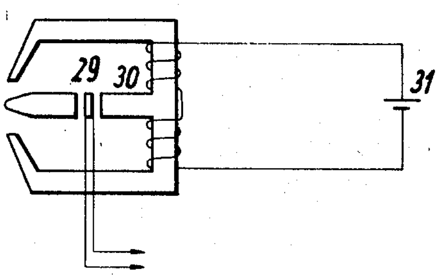
FIG. 5 is another embodiment of the construction of the control magnetic head, in which field plate is used, in accordance with the present invention.

FIG. 5 shows a control magnetic head constructed similarly to the embodiment of FIG. 4. The coil of this magnetic head has a DC current applied to it. The magnetic head of FIG. 5 is designed in the form of a magnetic bridge circuit in which a central core 30 forms the measuring means. Depending upon the difference of the permeability at the gap portions formed through the parts or portions of the core of the design of FIG. 5, a magnetic flux generated by the source 31 prevails at the central core 30, which may be measured with the aid of the field plate 29. The output signal from the field plate can be applied to indicating instruments similar to that described in relation to FIGS. 2 and 3 above. In the case of FIG. 5, however, rectification of the output signal is not required.

It will be understood that each of the elements described above, or two or more together, may also find a useful application in other types of constructions differing from the types described above.

While the invention has been illustrated and described as embodied in magnetic tape recording arrangements, it is not intended to be limited to the details shown, since various modifications and structural changes may be made without departing in any way from the spirit of the present invention.

What is claimed as new and desired to be protected by Letters Patent is set forth in the appended:

1. An arrangement for controlling the recording of signals on magnetic storage means comprising, in combination, magnetic storage means moving along a predetermined direction; recording means for recording signals on said magnetic storage means, said storage means having tracks inclined to said predetermined direction; control magnetic head means located behind said recording means in the direction of motion of said magnetic storage means; electromagnetic coil means on said control magnetic head means for directing magnetic flux lines perpendicular to the direction of said tracks; and means including said control magnetic head for generating a signal dependent upon the degree of magnetization of said tracks and independent of the polarization of said magnetization.

2. The arrangement for controlling the recording of signals on magnetic storage means as defined in claim 1, wherein said electromagnetic coil means comprises an oscillating circuit with an applied AC voltage, the resonance frequency of said oscillating circuit being dependent upon the magnetization of said magnetic storage means tracks, variations in said resonance frequency being convertible into variations of said AC voltage.

3. The arrangement for controlling the recording of signals on magnetic storage means as defined in claim 1 including means for applying a constant direct current to said electromagnetic coil means on said control magnetic head means; means in the magnetic circuit for measuring the magnetic flux; and indicating means for indicating said voltage signal.

4. The arrangement for controlling the recording of signals on magnetic storage means as defined in claim 3, wherein said means in said magnetic circuit for measuring the magnetic flux comprises a field plate.

5. The arrangement for controlling the recording of signals on magnetic storage means as defined in claim 1, wherein the magnetic circuit of said control magnetic head means is in form of a bridge circuit having a branch with a gap formed from two member parts, and having another branch with two member parts supporting said electromagnetic coil means.

6. The arrangement for controlling the recording of signals on magnetic storage means as defined in claim 5 including field plate means in the diagonal of said bridge circuit corresponding to the magnetic flux path, said field plate means measuring said magnetic flux; and means for indicating said voltage signal dependent upon the magnetization of said tracks.

7. The arrangement for controlling the recording of signals on magnetic storage means as defined in claim 5 including means for applying AC voltages of opposite phase to the terminal ends of said coil means, the amplitudes of said opposite AC voltages being substantially equal; and means for indicating the resulting output voltage from said coil means dependent upon the magnetization of said magnetic storage means.

8. The arrangement for controlling the recording of signals on magnetic storage means as defined in claim 1, wherein said recording means comprises a plurality of recording heads, the control over the tracks of the different recording heads being under cyclical interchange control.

9. The arrangement for controlling the recording of signals on magnetic storage means as defined in claim 8 including oscilloscope means for indicating said voltage signal, said voltage signal being applied to one pair of plates of said oscilloscope; and means for generating a timing signal voltage for applying to the other pair of plates of said oscilloscope.

10. The arrangement for controlling the recording of signals on magnetic storage means as defined in claim 9 including a rotating member for carrying said recording heads, said timing signal voltage being generated synchronously as a function of the rotational frequency of said rotating member.

11. The arrangement for controlling the recording of signals on magnetic storage means as defined in claim 8 including means for selectively measuring voltage as a function of time; and indicating means for indicating the magnetization of the individual tracks in sequence.

12. The arrangement for controlling the recording of signals on magnetic storage means as defined in claim 8 including means for selectively measuring voltage as a function of time; and means for indicating when the magnetization of the individual tracks falls outside lower and upper predetermined limits.

13. The arrangement for controlling the recording of signals on magnetic storage means as defined in claim 12, wherein said indicating means comprises an optical indicator.

14. The arrangement for controlling the recording of signals on magnetic storage means as defined in claim 12, wherein said indicating means comprises an acoustical indicator.

* * * * *